March 23, 1937.　　　E. C. BIXEL ET AL　　　2,074,358
VEHICLE COVER
Filed Dec. 10, 1935

INVENTOR
E. C. Bixel and
BY T. C. Smith
ATTORNEY

Patented Mar. 23, 1937

2,074,358

UNITED STATES PATENT OFFICE 2,074,358

VEHICLE COVER

Edward Carl Bixel, West Orange, and Temple Clifford Smith, Westfield, N. J., assignors to American Telephone and Telegraph Company, a corporation of New York Application December 10, 1935, Serial No. 53,776

4 Claims. (Cl. 296—100)

This invention relates to covers for vehicles, and more particularly to automotive vehicles such as automobile trucks.

It is one of the objects of this invention to provide a roof covering for automobile trucks which may be operated alternately to an extended position to function as a protective covering or to a closed or telescoped position when not in use.

Another object is to provide a structure of the above character which is capable of easy and rapid manipulation to either of its positions.

A further object consists in the provision of a roof structure of simple and lightweight construction.

These and further objects will be apparent from the following description when considered in connection with the accompanying drawing in which one embodiment of the invention is illustrated.

Referring to the drawing, Figure 1 is a sectional side elevation of the improved arrangement showing the sections of the roof construction in telescoped position;

Figure 1:
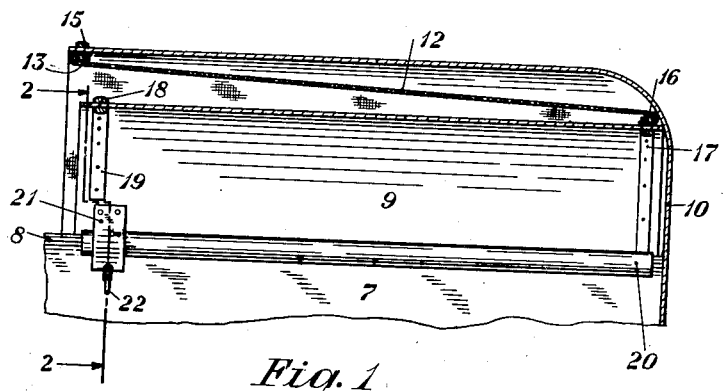

Referring more particularly to the drawing, in which like characters of reference designate like parts throughout the several figures, an automobile truck is shown at 5. This truck may be of any conventional type and may be provided with the usual form of cab, and extending rearwardly of the cab are illustrated parallel side portions 6, 6. These side portions may be provided with compartments for tools, equipment or the like, but as the make-up, formation or contour of these side portions forms no part of the invention, further illustration is not necessary. A panel 7 is disposed on the top of each side portion and may be substantially of the configuration shown. These side panels 7, 7 are made from any suitable metal and may be integral with or affixed to the side portions 6 as desired. The side portions and associated panels extend forwardly from the end of the truck and abut the rear wall of the cab. The upper portions of the side panels are shown as being slightly inclined and terminating in rolled or tubular flanges 8. These flanges form guide rails for a slidable section 9 of the roof covering, which will be presently described.

A fixed section of the roof covering is shown at 10, and which is positioned just behind the truck cab. This section, similarly to the slidable section 9, is preferably of substantially arcuate formation and may be affixed by laterally extending flanges 11 to like flanges provided on the side panels 7, or in any other desired manner. The fixed section 10 is of larger radius than the slidable section 9 so that the latter section may be moved to a telescoped position within the section 10, as will be later referred to in detail. The sections 9 and 10 may be made of any suitable metal or other material desired.

A flexible section 12 lies intermediate the fixed section 10 and the movable section 9 and interconnects the adjacent edges of these sections. The flexible section may be made from any suitable waterproof material, and rubberized fabric has been found to provide an efficient covering for this purpose. To compensate for the difference in size between the front or outer and fixed section 10 and the rear or smaller slidable section 9, the flexible section 12 is so cut that it tapers toward the smaller section 9. The flexible section is affixed to the section 10 by means of an arcuate formed clamping rib 13 positioned on the inner side of the section 10 (Fig. 1). The front end of the flexible material of section 12 is wrapped about the rib 13, and suitably spaced rivets 14 pass through the clamping rib 13 and a coinciding outer and reenforcing rib 15 serve to rigidly clamp the ribs 13 and 15 and hold the front end of the flexible section securely in position. The rear end of the flexible section 12 is affixed to the slidable section 9 in a manner similar to that described in connection with its attachment to the fixed section 10. In its attachment to section 9, however, the end of the flexible section 12 is wrapped about the arcuate shaped rib 16 which is positioned near the outer edge of the section 9, while a coinciding rib 17 positioned near the inner edge of said section functions in this case as the reenforcing rib. Additional ribs 18 and 19 may also be provided on the rear edge of the slidable section to serve both as a reenforcement and a surface which may be readily grasped to manipulate the slidable section in its movement back and forth.

Figure 3:
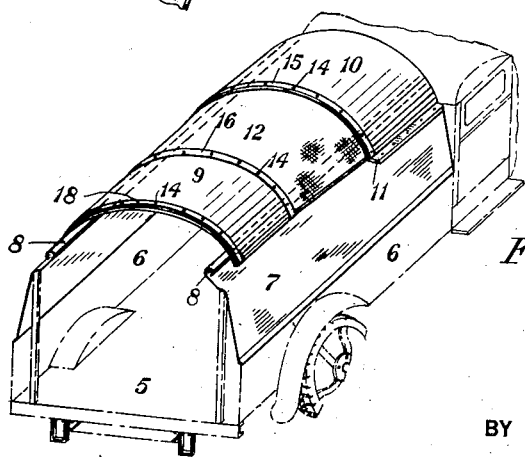
Fig. 3 is a perspective view of the roof covering in its extended position showing it in place upon an automobile truck.

A tubular member 20 having a longitudinal slot cut therein is suitably affixed by welding or otherwise to the slidable section 9 and extends along each of its parallel sides. These parallel members 20 are so arranged that when in position they slidably engage the parallel guide rails 8 on the side panels 7. When so mounted the slidable section may be moved back and forth along the guide rails to a telescopic position within the fixed section 10, as shown in Fig. 1, or to an extended position as shown in Fig. 3. In the telescoped position of the sections the flexible section will lie in a position between the adjacent surfaces of the sections 9 and 10. The length of section 10 is such that in the telescoped position of the sections 9 and 12, the section 9 will be completely housed in the section 10 and the flexible section 12 will be drawn taut, as shown.

In the extended position of the improved cover the sections will provide an enclosure for the truck floor. The adjustment of the cover from its telescoped position to its extended position is accomplished by merely grasping the rear edge or the ribs 18 and 19 of the slidable section and pulling the latter section and flexible section outwardly from the fixed section to their limit of travel. To restore the slidable and fixed sections to their position within the fixed section the slidable section is pushed back, the tubular member of the slidable section moving along the guide rails, until the sections 9 and 12 assume the position shown in Fig. 1.

Figure 2:
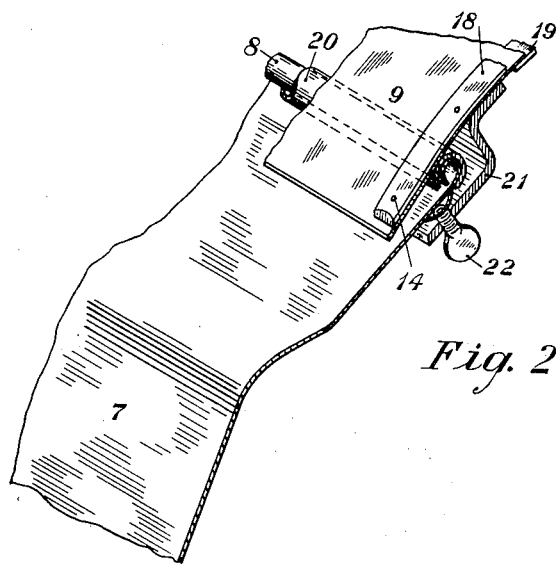
Fig. 2 is a section taken on the line 2—2 of Fig. 1.

In the extended position of the cover the flexible section will be drawn tightly between its associated sections and will provide with them a waterproof covering. The cover may be maintained in its extended position by any suitable locking means such, for instance, as is illustrated in Fig. 2. This locking means consists of a substantially S-shaped plate 21 affixed at one of its legs to the inner surface of the slidable section near the rear edge thereof, and the other leg of the plate carries a thumbscrew 22 which is adapted to be pressed against the side panel 7 to clamp the slidable section 9 in its telescoped or extended position, or in any other intermediate position of its travel.

From the foregoing it is thought that the construction, operation and many advantages of the herein described and delineated invention will be apparent to those skilled in the art without further description. It will be understood that various changes in the size, shape, proportion and minor details of construction may be resorted to without departing from the spirit or sacrificing any of the advantages of the invention as defined in the appended claims.

What is claimed is:

1. A cover for vehicles, including two rigid sections of similar curvilinear formation, one of which is movable and the other fixed, a flexible section interconnecting the adjacent edges of said rigid sections, a guide rail extending longitudinally on each side of the vehicle, said movable section being movable along said guide rails into two positions, one of which is telescoped with respect to the fixed section, and the other extended from said fixed section, said flexible section being of the same curvilinear formation when said rigid sections are in the extended position and being of the same curvilinear formation, when said flexible section is lying between the adjacent faces of the two rigid sections in telescoped position with its surfaces reversed.

2. A cover for vehicles, including a pair of rigid sections of similar curvilinear formation, a guide rail extending longitudinally on each side of the vehicle, one of said sections being affixed forwardly of the vehicle, and the other section having its extremities slidably attached to and adapted to move in an upright position along the guide rails of the vehicle from a telescoped position within the forward section to an extended position at the rear of the vehicle, and a flexible section arranged to interconnect adjacent edges of the rigid sections and to partake of the movement of the slidable section, so that the flexible section will assume a curvilinear formation similar to that of the fixed section and the slidable section in the telescoped position and in the extended position of the latter section, said flexible section lying taut between the adjacent surfaces of the rigid sections when in telescoped position and with its surfaces reversed, said flexible section in extended position lying taut between the adjacent edges of the fixed section and slidable section with its surfaces in normal position, and forming therewith a cover for the vehicle.

3. A cover for vehicles, including a pair of rigid sections of similar curvilinear formation, guide rails extending longitudinally on each side of the vehicle, one of said sections being affixed forwardly of the vehicle, and the other section having its extremities slidably attached to and adapted to move in an upright position along the guide rails of the vehicle from a telescoped position within the forward section to an extended position at the rear of the vehicle, and a flexible section arranged to interconnect adjacent edges of the rigid sections and to partake of the movement of the slidable section, so that the flexible section will assume a curvilinear formation similar to that of the fixed section and the slidable section in the telescoped position and in the extended position of the latter section, said flexible section lying taut between the adjacent surfaces of the rigid sections when in telescoped position and with its surfaces reversed, said flexible section in extended position lying taut between the adjacent edges of the fixed section and slidable section with its surfaces in normal position, and forming therewith a cover for the vehicle, and means for locking the slidable section in each of its positions.

4. The combination of a vehicle having side panels, guide rails extending longitudinally of said panels, a cover for said vehicle, including two rigid sections of similar formation, one of said sections being fixed at the forward portion of the vehicle and the second section being movable in an upright position along said guide rails between a telescoped position within the fixed section and an extended position at the rear of the vehicle and a flexible section interconnecting adjacent edges of the rigid sections and being disposed between adjacent faces thereof in the telescoped position of the movable member and lying taut between its associated sections and forming therewith a cover for the vehicle in the extended position of the movable section.

EDWARD C. BIXEL.
TEMPLE C. SMITH.